(12) United States Patent
Yamamoto et al.

(10) Patent No.: US 12,493,300 B2
(45) Date of Patent: Dec. 9, 2025

(54) SYSTEM AND MAGNETIC MARKER DETECTION METHOD

(71) Applicant: Aichi Steel Corporation, Tokai (JP)

(72) Inventors: Michiharu Yamamoto, Tokai (JP); Tomohiko Nagao, Tokai (JP); Hitoshi Aoyama, Tokai (JP)

(73) Assignee: Aichi Steel Corporation, Tokai (JP)

( * ) Notice: Subject to any disclaimer, the term of this patent is extended or adjusted under 35 U.S.C. 154(b) by 29 days.

(21) Appl. No.: 18/559,578

(22) PCT Filed: May 11, 2022

(86) PCT No.: PCT/JP2022/019880
§ 371 (c)(1),
(2) Date: Nov. 8, 2023

(87) PCT Pub. No.: WO2022/239786
PCT Pub. Date: Nov. 17, 2022

(65) Prior Publication Data
US 2024/0231376 A1    Jul. 11, 2024

(30) Foreign Application Priority Data
May 12, 2021 (JP) ................. 2021-081216

(51) Int. Cl.
G05D 1/244 (2024.01)
G05D 105/85 (2024.01)
G05D 109/10 (2024.01)

(52) U.S. Cl.
CPC ......... *G05D 1/244* (2024.01); *G05D 2105/85* (2024.01); *G05D 2109/10* (2024.01)

(58) Field of Classification Search
None
See application file for complete search history.

(56) References Cited

U.S. PATENT DOCUMENTS 11,604,476 B1*   3/2023  Leefer .............. H04L 67/12
2019/0179329 A1*  6/2019  Keivan ............ G05D 1/0221
2020/0272167 A1   8/2020  Furihata et al.
(Continued)

FOREIGN PATENT DOCUMENTS

EP     3805698 A1     4/2021
JP     H03-148709 A   6/1991
(Continued)

OTHER PUBLICATIONS

International Search Report and Written Opinion mailed on Jul. 5, 2022, received for PCT Application PCT/JP2022/019880, filed on May 11, 2022, 8 pages including English Translation.

*Primary Examiner* — Jason Holloway
*Assistant Examiner* — Christopher A Buksa
(74) *Attorney, Agent, or Firm* — XSENSUS LLP

(57) ABSTRACT

A patrol robot including a plurality of magnetic sensors for detecting a magnetic marker laid on a traveling road has at least two or more magnetic sensors arrayed on a sensor array line linearly extending along any direction. In the patrol robot, two sensor array lines are formed, and since at least any one sensor array line can cross with respect to a relative moving direction of the magnetic marker with a movement of the patrol robot, the magnetic marker can be detected with high reliability, irrespective of the moving mode.

15 Claims, 16 Drawing Sheets

(56) References Cited

U.S. PATENT DOCUMENTS

| | | | |
|---|---|---|---|
| 2021/0215507 A1 | 7/2021 | Yamamoto et al. |
| 2022/0011102 A1 | 1/2022 | Yamamoto et al. |

FOREIGN PATENT DOCUMENTS

| | | |
|---|---|---|
| JP | 2008-033759 A | 2/2008 |
| JP | 2020-135619 A | 8/2020 |
| WO | 2020/175438 A1 | 9/2020 |

\* cited by examiner

SYSTEM AND MAGNETIC MARKER DETECTION METHOD

CROSS-REFERENCE TO RELATED APPLICATIONS

The present application is based on PCT filing PCT/JP2022/019880, filed May 11, 2022, which claims priority from Japanese Patent Application No. 2021-081216, filed May 12, 2021, the entire contents of each are incorporated herein by reference.

TECHNICAL FIELD

The present invention relates to a system and magnetic marker detection method for a vehicle to detect a magnetic marker laid on a road surface.

BACKGROUND ART

Conventionally, for example, a system including a vehicle which detects a magnetic marker laid on a road surface has been known (for example, refer to Patent Literature 1). The vehicle in this system has a plurality of magnetic sensors arrayed along the vehicle-width direction. In this system, the magnetic marker is tried to be detected by using the plurality of magnetic sensors arrayed in a direction substantially orthogonal to a forwarding direction of the vehicle.

CITATION LIST

Patent Literature

Patent Literature 1: Japanese Unexamined Patent Application Publication No. 2020-135619

SUMMARY OF INVENTION

Technical Problem

However, the above-described conventional system has a possibility that, for example, when a vehicle capable of making a lateral movement is assumed, the magnetic marker cannot be detected with high reliability by the magnetic sensors arrayed along the vehicle-width direction.

The present invention was made in view of the above-described conventional problem, and is to provide a system and magnetic marker detection method capable of detecting a magnetic marker with high reliability, irrespective of the mode in which the vehicle moves.

Solution to Problem

One mode of the present invention resides in a system including a vehicle provided with a plurality of magnetic sensors to detect a magnetic marker laid in or on a traveling road, wherein the plurality of magnetic sensors include at least two or more magnetic sensors arrayed on a sensor array line linearly extending along any direction, and
in the vehicle, at least one sensor array line is formed, and
the at least one sensor array line is configured to be able to cross with respect to a relative moving direction of the magnetic marker with a movement of the vehicle.

One mode of the present invention resides in a magnetic marker detection method in a vehicle provided with a plurality of magnetic sensors to detect a magnetic marker laid in or on a traveling road and capable of a motion with a relative movement of the magnetic marker along a vehicle-width direction, the method for detecting the magnetic marker during the motion, wherein the vehicle is the vehicle forming the above-described one mode,
the method includes:
a selecting process of selecting at least any two or more magnetic sensors among the plurality of magnetic sensors including magnetic sensors arrayed on the sensor array line linearly extending along the any direction; and
a detection process of detecting the magnetic marker by processing magnetic measurement values by the at least any two or more magnetic sensors selected by the selecting process, and
in the selecting process, magnetic sensors arrayed on the at least one sensor array line crossing with respect to the relative moving direction of the magnetic marker with the motion of the vehicle are selected.

Advantageous Effects of Invention

In the present invention, the sensor array line having at least two or more magnetic sensor arrayed thereon can cross with respect to the relative moving direction of the magnetic marker with the movement of the vehicle. By using the magnetic sensors arrayed on the at least one sensor array line crossing with respect to the relative moving direction of the magnetic marker with the movement of the vehicle, the magnetic marker can be detected with high reliability.

According to the present invention, the magnetic marker laid in or on the traveling road can be detected with high reliability, irrespective of the mode in which the vehicle moves.

DESCRIPTION OF EMBODIMENTS

Embodiments of the present invention are specifically described by using the following embodiments.

First Embodiment

The present example is an example regarding patrol system 5S including patrol robot 1 which patrols the inside of facility 5 such as a hotel or hospital. This patrol robot 1 can make autonomous movements while detecting magnetic marker 50 laid on floor surface 53S (road surface) forming a surface of a traveling road. Details of this are described with reference to FIG. 1 to FIG. 14.

Figure 1:
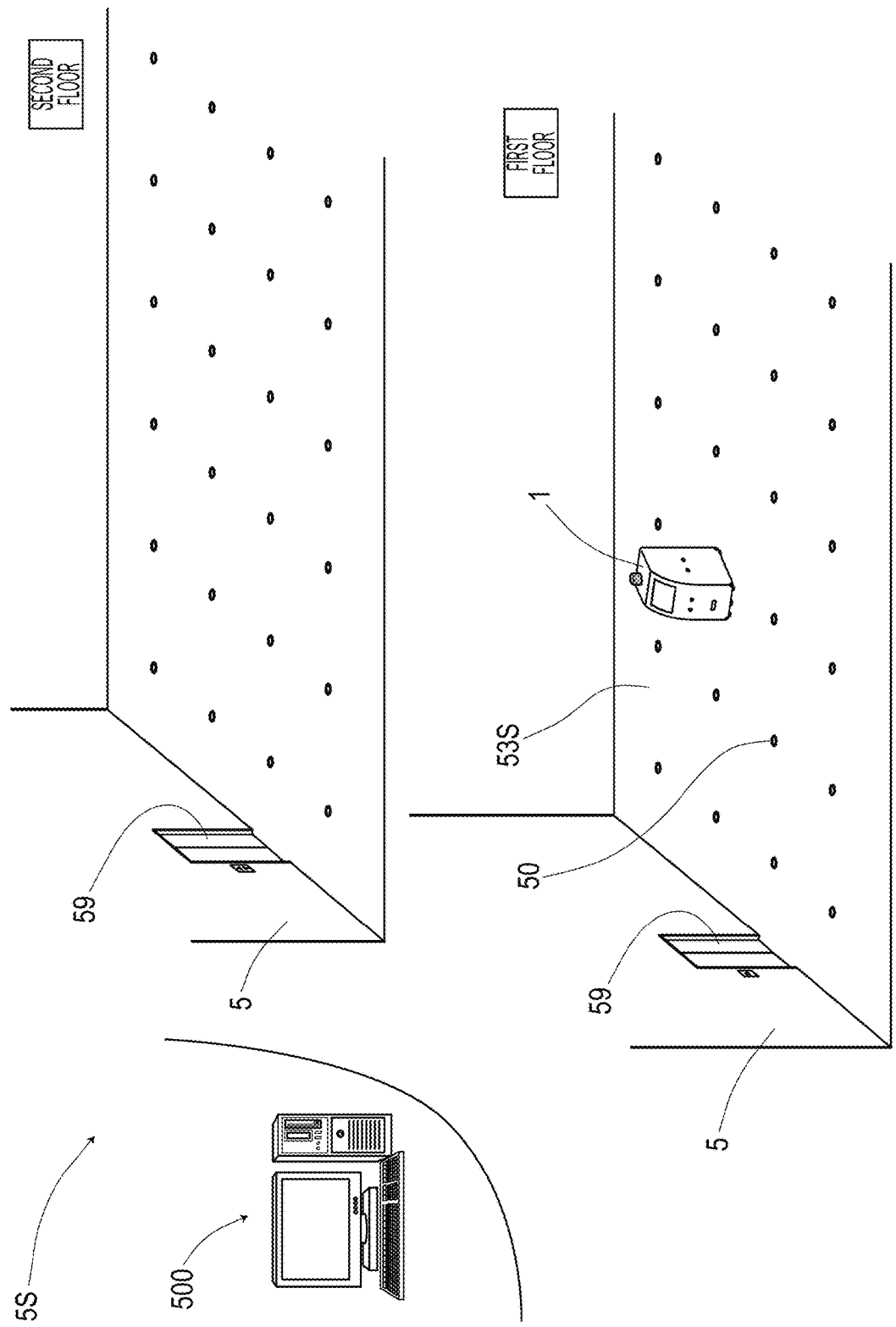
FIG. 1 is a descriptive diagram of a patrol system in a first embodiment.

Patrol robot 1 is, as in FIG. 1, one example of a vehicle capable of autonomously moving inside facility 5, and is one example of a system. Patrol robot 1, for example, waits at a parking location not depicted in facility during the daytime, and, when a nighttime patrol time comes, patrols inside facility 5 along a predetermined route. Any route can be set on, for example, a map (omitted in the drawing) displayed by control-purpose PC 500. Setting information such as the route and the patrol time set at control-purpose PC 500 is transmitted to patrol robot 1 via, for example, wireless communication such as Wi-Fi (registered trademark).

Note that control-purpose PC 500 is installed in a management space inside facility 5. In place of this, control-purpose PC 500 may be installed outside in an environment connectable to a public communication line such as the Internet. Control-purpose PC 500 may be installed anywhere in an environment where information can be transmitted to and received from patrol robot 1.

When the patrol time received from control-purpose PC 500 comes, patrol robot 1 moves along the set route, thereby performing patrol inside facility 5. Note that patrol robot 1 can move between floors by using elevator 59, thereby being able to perform patrol each floor in facility 5. When detecting a suspicious object or suspicious person during patrol, patrol robot 1 notifies control-purpose PC 500 of an anomaly. In the following, (1) control-purpose PC, (2) magnetic marker, and (3) patrol robot, which configure patrol system 5S, are described in this order.

(1) Control-Purpose PC

Control-purpose PC 500 is a device including a display device such as a display; a main unit having incorporated therein an electronic substrate with a CPU implemented thereon and a storage device accessible by the CPU; a user interface such as a keyboard and mouse; and so forth. The storage device is provided with a map DB, which is a database of a map representing the structure inside facility 5.

In the map stored in the map DB, the laying position of each magnetic marker 50 is identified. To each laying position, a marker ID is linked, which is identification information of magnetic marker 50. With reference to the map DB by using the marker ID, the position of corresponding magnetic marker 50 on the map can be identified. Also, on the map, furniture such as chairs, desks, and cabinet and the structure inside the facility such as doors and passages are written. In setting information to be transmitted from control-purpose PC 500 to patrol robot 1, in addition to information about the route, information indicating the surrounding structure at each position on the route is included. As the surrounding structure, the arrangement of the furniture, the structure of the doors, the passages, and so forth, and others are included.

(2) Magnetic Marker

Magnetic marker 50 is a marker as a magnetism generation source acting with magnetism on the surroundings. In patrol system 5S of the present embodiment, magnetic markers 50 are arranged on floor surface 53S of an area where patrol robot 1 inside facility 5 can move so as to form a lattice shape. The arrangement pitch of magnetic markers 50 is 1 m in a matrix. Note that the arrangement pitch of magnetic markers 50 can be changed as appropriate. In the configuration of the present embodiment, the entire area where patrol robot 1 inside facility 5 can move is set as a traveling road.

Figure 2:
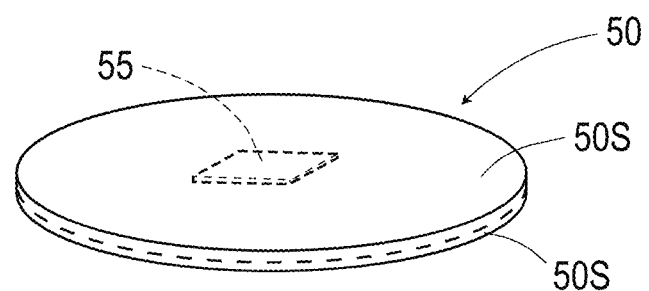
FIG. 2 is a descriptive diagram of a magnetic marker in the first embodiment.
Figure 3:
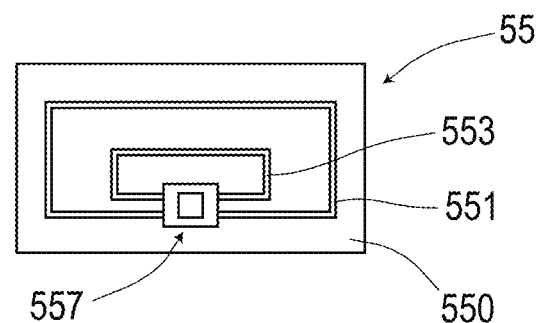
FIG. 3 is a front view of an RFID tag in the first embodiment.
Figure 4:
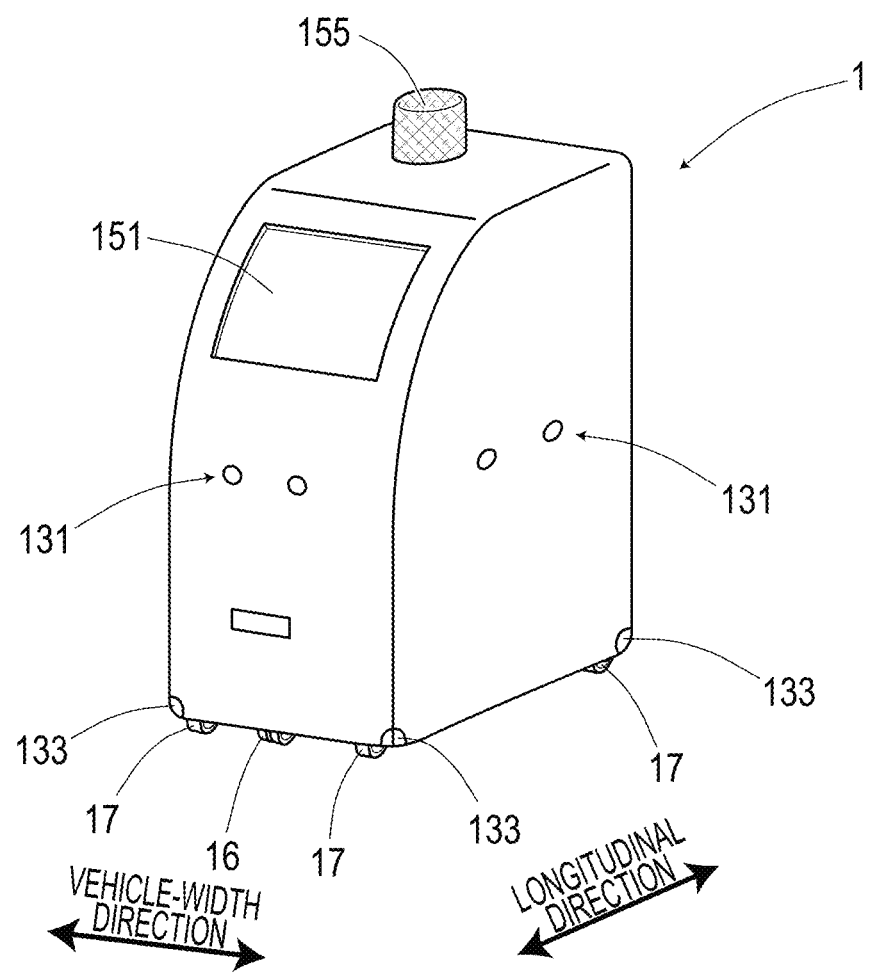
FIG. 4 is a perspective view of a patrol robot in the first embodiment.

Magnetic marker 50 forms, as in FIG. 2, a sheet shape having a diameter 100 mm and a thickness of 2 mm. Magnetic marker 50 can be laminated on floor surface 53S. Magnetic marker 50 is a sheet body with two magnet sheets 50S each having a thickness of 1 mm laminated together. Magnet sheet 50S is a ferrite rubber magnet (magnet) having magnetic powder of iron oxide as a magnetic material dispersed into a polymer material as a base material. Note that the diameter of magnetic marker 50 is preferably set at 10 mm to 200 mm.

In magnetic marker 50 of the present embodiment, sheet-shaped RFID tag (Radio Frequency Identification Tag, wireless tag) 55 is interposed between two magnet sheets 50S. RFID tag 55 is a sheet-shaped electronic component having IC chip 557 implemented on a surface of tag sheet 550. Tag sheet 550 is a sheet-shaped component cut out from, for example, a PET (PolyEthylene Terephthalate) film. RFID tag 55 (FIG. 3) is an electronic component which operates by external wireless power feeding and outputs tag information via wireless communication. RFID tag 55 of the present embodiment transmits the marker ID, which is identification information of magnetic marker 50, as tag information.

On the surface of tag sheet 550, a printed pattern of loop coil 551 and antenna 553 is provided. Loop coil 551 is a power-receiving coil where exciting current is generated by external electromagnetic induction. Antenna 553 is a transmission antenna for wireless transmission of the above-described tag information and so forth.

Note that, as described above, magnet sheet 50S is a sheet-shaped magnet having magnetic powder of iron oxide dispersed into a polymer material. This magnet sheet 50S has electric characteristics in which conductivity is low and eddy current hardly occurs at the time of wireless power feeding. Therefore, a possibility that eddy current occurs on magnet sheet 50S due to radio waves received by and transmitted from RFID tag 55 is low. RFID tag 55 in a state of being interposed between two magnet sheets 50S can efficiently receive wirelessly-transmitted electric power, and can transmit tag information with high reliability.

(3) Patrol Robot

Patrol robot 1 is a robot-type vehicle capable of autonomous movements, and is one example of the system. The shape of patrol robot 1 is a stand-type shape having a length of 55 cm, a width of 48 cm, and a height of 100 cm. An upper portion of a front surface of patrol robot 1 is formed in an inclined shape. In the inclined surface of the front surface of patrol robot 1, touch panel 151 to which touch operation can be inputted is buried. Also, rotating lamp 155 is provided to stand on the upper surface of patrol robot 1. When an anomaly is detected, a warning screen is displayed on touch panel 151, and rotating lamp 155 lights up.

Patrol robot 1 includes depth cameras 131, which are area sensors. Depth cameras 131, which are so-called stereo cameras, are provided on the front surface, the rear surface, and the left and right side surfaces of patrol robot 1. Depth cameras 131 can be used for detection of an obstacle and a person and measurement of a distance to a target object.

Depth cameras 131 are utilized also for moving subject detection. A moving subject can be efficiently detected based on a differential image, which is a temporal difference between images taken by the camera. Ultrasonic sensor 133, which is an area sensor, is attached at each of front, rear, left and right corner portions of patrol robot 1. Note that a Lidar (Laser Imaging Detection and Ranging) using light or a range sensor such as a milliwave radar may be used as an area sensor and the arrangement, combination, and so forth of area sensors can be changed as appropriate.

Figure 5:
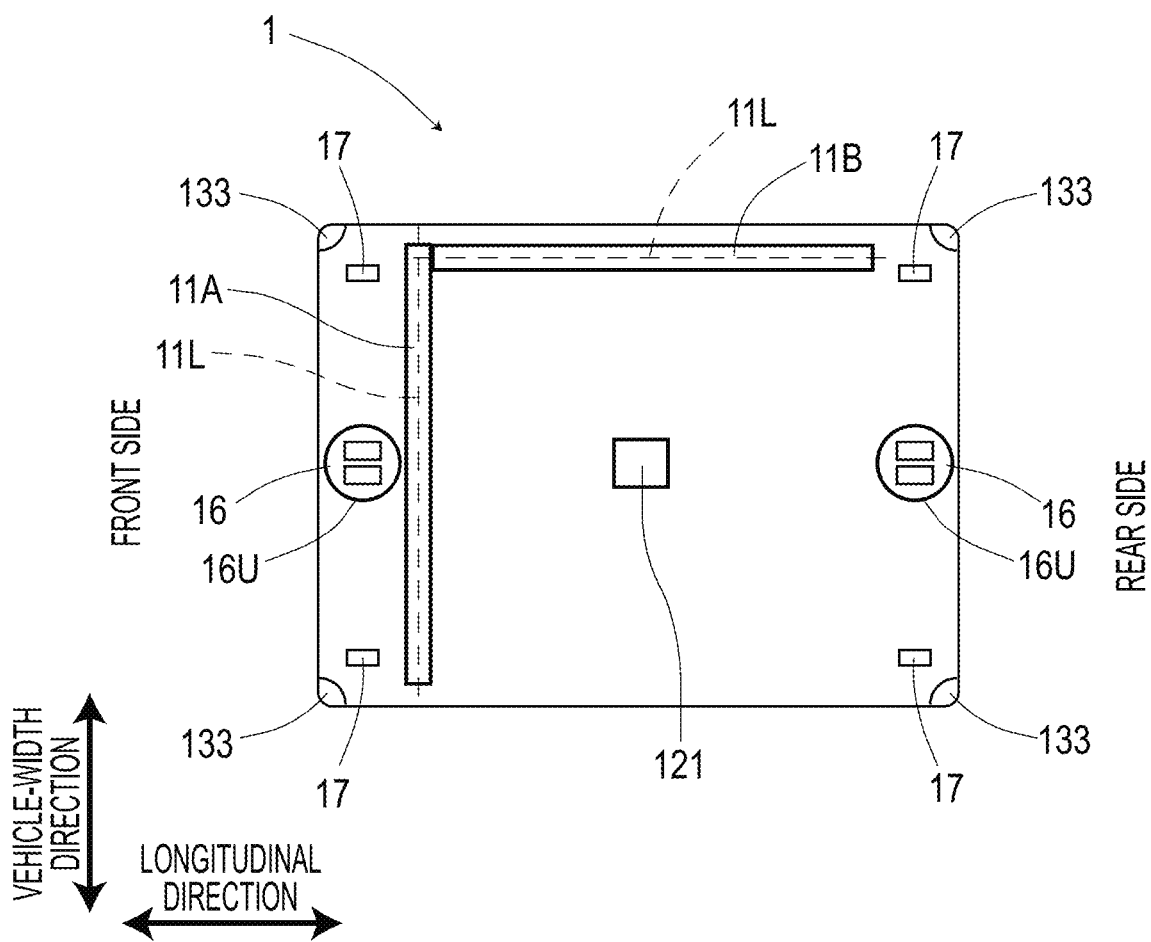
FIG. 5 is a bottom view of the patrol robot in the first embodiment.
Figure 6:
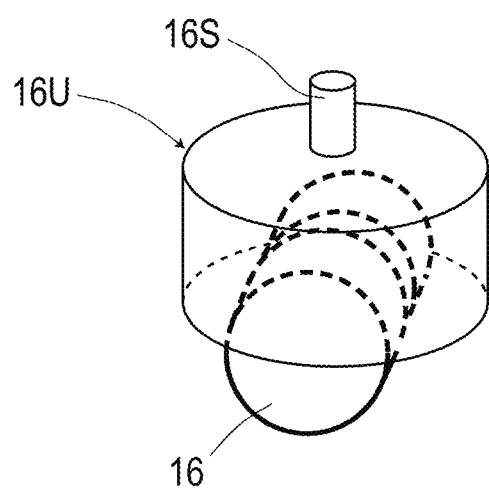
FIG. 6 is a perspective view of a driving wheel unit in the first embodiment.

Patrol robot 1 has, as in a bottom view of FIG. 5, two driving wheels 16 at two locations, front and rear, and includes swivel wheels 17 at four corners on the bottom surface in which is a substantially rectangular shape. Driving wheels 16 are wheels that can each change its rolling direction and generate a rotation driving force. Also, at a substantially center of the bottom surface, tag reader 121 for communication with RFID tag 55 is disposed.

Tag reader 121 functions as an information reading part which reads information wirelessly outputted from RFID tag 55. Tag reader 121 wirelessly transmits electric power required for operation of RFID tag 55 (power transmission), and receives tag information transmitted from RFID tag 55. As described above, in the tag information, the marker ID is included, which is identification information of magnetic marker 50.

Front and rear driving wheels 16 (FIG. 6) are rotatably supported by driving wheel unit 16U. Driving wheel unit 16U forms a columnar shape, and has rotating shaft 16S provided to extend along its center axis. Driving wheel unit 16U is rotatably supported by a main body side (FIG. 5) of patrol robot 1 via rotating shaft 16S.

Figure 7:
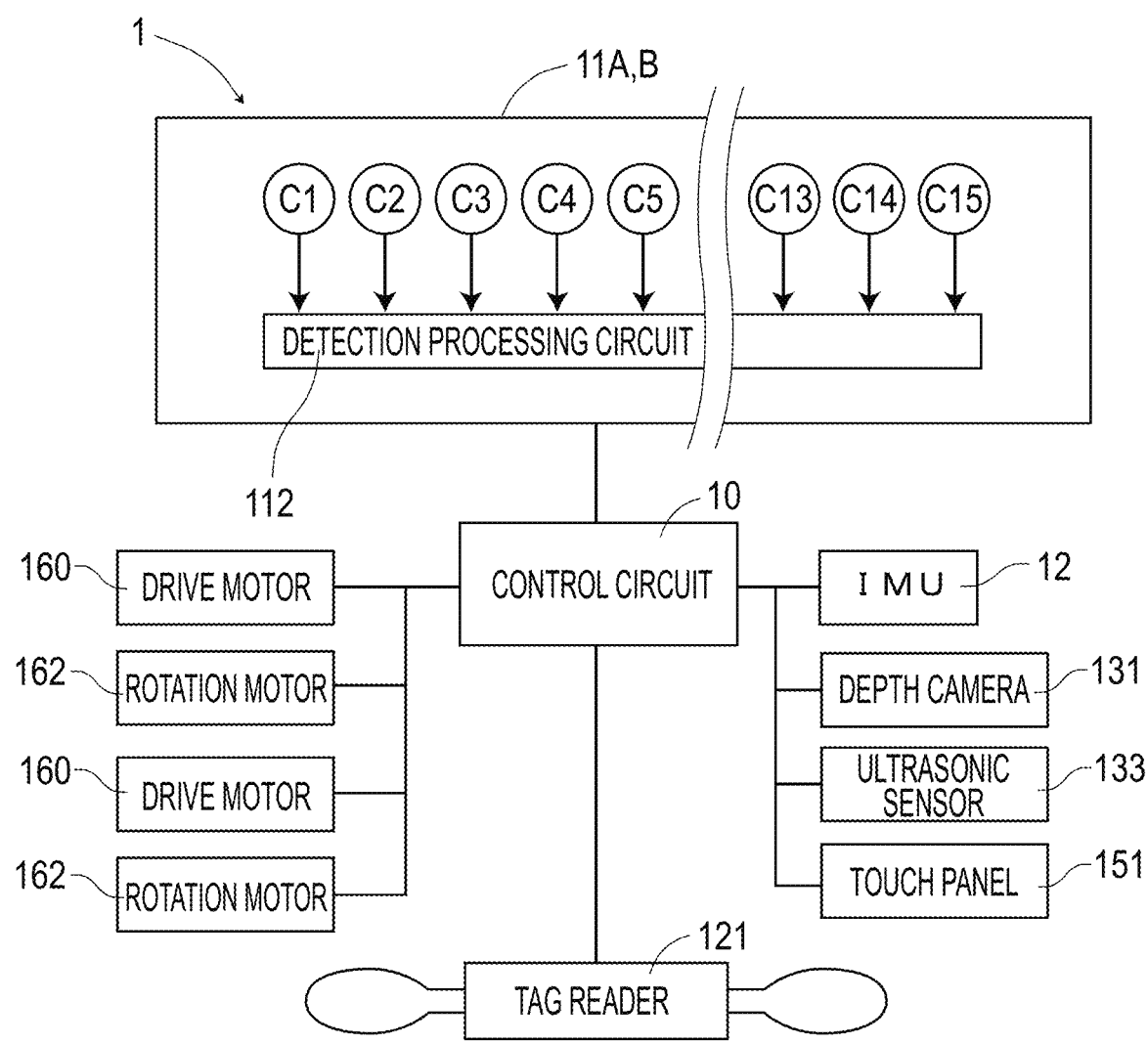
FIG. 7 is a block diagram depicting an electrical configuration of the patrol robot in the first embodiment.

Front and rear driving wheels 16 are each individually controlled by drive motor 160 and rotation motor 162 (FIG. 7). Note in FIG. 6 that depiction of drive motors 160 and rotation motors 162 are omitted. Drive motor 160 is a motor for rolling driving wheel 16 on floor surface 53S. Rotation motor 162 is a motor for rotating driving wheel unit 16U by taking rotating shaft 16S as a center. Driving wheel unit 16U can be rotated by rotation motor 162 through 360 degrees. In accordance with rotation of driving wheel unit 16U, the rolling direction of driving wheel 16 is changed.

On the bottom surface (FIG. 5) of patrol robot 1, sensor arrays 11A and 11B are provided. Sensor arrays 11A and 11B is a rod-shaped unit having a plurality of magnetic sensors arrayed along sensor array line 11L extending linearly. Sensor array 11A is attached so as to be along a vehicle-width direction, and sensor array 11B is attached so as to be along a longitudinal direction. Sensor array 11A and sensor array 11B are attached so as to form a substantially L shape. Sensor arrays 11A and 11B have the same specifications, and each have fifteen magnetic sensors with 3 cm pitches. Note that sensor array 11A and sensor array 11B may share and use a magnetic sensor positioned at a corner part of the substantially L shape.

Patrol robot 1 includes an electrical configuration depicted in FIG. 7. In addition to the above-described configuration, patrol robot 1 has incorporated therein IMU 12, control circuit 10, a battery not depicted, and so forth. IMU 12 is arranged at a low position at the center of the vehicle body so as to be able to measure an angular velocity and acceleration of patrol robot 1 with high accuracy.

IMU 12 is an internal navigation unit for estimating a position and azimuth (orientation) of patrol robot 1 by inertial navigation. IMU 12 has a function as a fluctuation amount estimating part which estimates a fluctuation amount with movement of patrol robot 1, a function as a measuring part which estimates a position and azimuth of patrol robot 1 by using the estimated fluctuation amount, and so forth. IMU 12 is configured to include a biaxial acceleration sensor which measures accelerations in the longitudinal direction and the width direction, a gyro sensor which measures an angular velocity (yaw rate), and so forth.

By integrating the yaw rate after movement starts, IMU 12 estimates a (accumulated) fluctuation amount of azimuths of patrol robot 1. IMU 12 adds the estimated fluctuation amount of the azimuth to the azimuth at a movement start time point (initial azimuth) of patrol robot 1, thereby estimating a momentary absolute azimuth with time of patrol robot 1. This azimuth of patrol robot 1 is an orientation of patrol robot 1, that is, the absolute azimuth in the longitudinal direction.

IMU 12 divides a time during movement into sufficiently short temporal zones, and estimates a two-dimensional displacement amount (positional fluctuation amount) for each zone. This zone is, for example, a sufficiently short temporal zone corresponding to a process time of one loop of repetition control by movement control of FIG. 11, which will be referred to further below. For each zone, IMU 12 performs double integration of each of acceleration in the longitudinal direction and acceleration in the width direction, thereby calculating a two-dimensional displacement amount. This two-dimensional displacement amount is a displacement amount with reference to the longitudinal direction of patrol robot 1.

IMU 12 identifies, for each zone after the start of movement, an absolute azimuth (for example, an average value or a median value) of patrol robot 1 and a two-dimensional displacement amount with reference to the longitudinal direction of patrol robot 1. By accumulating displacement amounts in each zone after the start of movement sequentially from the oldest time point, IMU 12 estimates a position of patrol robot 1 after movement on a two-dimensional plane in a horizontal direction, that is, a relative position after movement. Then, with reference to the position (initial position) of patrol robot 1 at the start of movement, IMU 12 estimates a position obtained by shifting by the relative position of patrol robot 1 after movement as a current position of patrol robot 1 after movement.

Furthermore, by integrating accelerations in the longitudinal direction and in the width direction, IMU 12 calculates a speed component in the longitudinal direction and a speed component in the width direction. According to the speed component in the longitudinal direction and the speed component in the longitudinal direction, a moving direction of patrol robot 1 can be identified. Note that this moving direction is a relative moving direction with reference to the orientation (in the longitudinal direction) of patrol robot 1 estimated by IMU 12 as described above.

Control circuit 10 is a circuit which controls operation of patrol robot 1. Control circuit 10 is configured to include an electronic substrate (omitted in the drawing) having implemented thereon a CPU which performs various arithmetic operations, memory elements such as a ROM and a RAM, and so forth. Control circuit 10 causes the CPU to execute a program stored in the ROM or the like, thereby achieving various functions. To control circuit 10, each of the above-described electrical configurations are connected, such as touch panel 151, sensor arrays 11A and 11B, IMU 12, tag reader 121, depth cameras 131, ultrasonic sensor 133, drive motor 160, and rotation motor 162. Note that drive motor 160 and rotation motor 162 are each provided to front and rear driving wheels 16.

A storage area of the RAM of control circuit 10 is provided with a work area. In this work area, setting information transmitted from control-purpose PC 500 to patrol robot 1 is stored. As described above, in this setting information, in addition to information about the route, information indicating the surrounding structure (such as the arrangement of furniture and the structure of doors, passages, and so forth) at each position on the route is included.

Note that the surrounding structure at each position on the route may be acquired (received) from control-purpose PC 500 as occasion arises in accordance with movement of patrol robot 1. Alternatively, patrol robot 1 may transmit information acquired regarding the surrounding structure to control-purpose PC 500 as occasion arises. In this case, it is preferably configured that an anomaly is detected on a control-purpose PC 500 side and the detection result is transmitted to patrol robot 1.

As a function to be achieved by control circuit 10, there are functions as an anomaly detecting part which detects an anomaly, a selecting part which selects a magnetic sensor for use in detection of magnetic marker 50, a movement control part which moves patrol robot 1, a communication circuit part which performs communication with control-purpose PC 500, and so forth.

Anomaly detecting part performs a moving subject detection process for detecting an anomaly of the surroundings, a structure comparison process for detecting an abnormality of the surrounding structure, and so forth. When an anomaly is detected by the anomaly detecting part, a notification is made by the communication circuit part including a function as an anomaly notifying part to control-purpose PC 500.

The moving subject detection process is a process of detecting a moving subject based on, for example, a differential image between temporally adjacent images among time-series images by depth camera 131. When no motion is present in the surroundings, data of each pixel of this differential image is substantially zero. The moving subject detection process of the present embodiment is a process which uses a change, to a positive side or a negative side, in data of each pixel configuring a motion area in this differential image when a motion occurs. The structure comparison process is a process of comparing a surrounding structure acquired by depth cameras 131 capable of distance measurement by so-called stereoscopic vision and a surrounding structure in the setting information stored in the work area as described above. When a structural difference occurs due to this structure comparison process, an anomaly is detected.

The selecting part selects a sensor array (magnetic sensor) for use in detection of magnetic marker 50 from among sensor arrays 11A and 11B. The selecting part selects either using sensor array 11A along the vehicle-width direction or using sensor array 11B along the longitudinal direction (selection process).

The movement control part performs control for moving patrol robot 1 along the route set (referred, as appropriate, to as a set route). By individually controlling the rolling direction and rotation of front and rear driving wheels 16, the movement control part causes patrol robot 1 to automatically move. The movement control part controls front and rear driving wheels 16 so as to suppress a positional deviation of patrol robot 1 with respect to the set route and so forth, thereby causing patrol robot 1 to self-propel along the set route. Also, the movement control part refers to the detection results and so forth by an area sensor such as depth cameras 131 or ultrasonic sensor 133 as occasion arises so that patrol robot 1 does not hit a wall or collide with an obstacle when moving.

As described above, control circuit 10 as the movement control part individually controls front and rear driving wheels 16 to cause patrol robot 1 to move. Patrol robot 1 can make diverse movements including a lateral movement and rotations in place, in accordance with settings of the rolling direction and the rotating direction of front and rear driving wheels 16. For example, when the rolling direction of front and rear driving wheels 16 matches the longitudinal direction, with front and rear driving wheels 16 similarly rotating, patrol robot 1 can advance and retreat in the longitudinal direction. For example, when the rolling direction of front and rear driving wheels 16 matches the vehicle-width direction, with front and rear driving wheels 16 similarly rotating, patrol robot 1 can move a lateral direction, which corresponds to the vehicle-width direction. On the other hand, when the rolling direction of front and rear driving wheels 16 matches the vehicle-width direction, if the front and rear driving wheels oppositely rotate, patrol robot 1 can rotate in place. Also, for example, when front and rear driving wheels 16 are in a direction of 45 degrees with respect to the longitudinal direction, patrol robot 1 can move in a diagonal direction. Furthermore, for example, when a difference in rolling direction of front and rear driving wheels 16 is set smaller than 45 degrees or smaller than 95 degrees, a movement such as being along an arc can be achieved. For example, when a difference in rolling direction of front and rear driving wheels 16 is set at 90 degrees and only one driving wheel 16 is rotated, a movement of patrol robot 1 turning by taking other driving wheel 16 as a center can be achieved.

Next, the configuration and functions of sensor arrays 11A and 11B are described. Sensor arrays 11A and 11B (FIG. 5 and FIG. 7) are, as described above, sensing units each including fifteen magnetic sensors Cn (n is an integer of 1 to 15) arrayed along linearly-extending sensor array line 11L (FIG. 5).

As magnetic sensors Cn, for example, highly-sensitive MI sensors which detect magnetism by using the known MI effect (Magneto Impedance Effect) or the like are suitable. The MI effect is an electromagnetic effect in which the impedance of a magneto-sensitive body such as, for example, an amorphous wire, sensitively changes in response to the external magnetic field. Magnetic sensors Cn are highly-sensitive sensors with a measurement range of magnetic flux density of ±50 milliteslas and a magnetic flux resolution of 0.2 microteslas in the measurement range.

In sensor arrays 11A and 11B, each magnetic sensor is incorporated so that their magnetism detecting directions match. Furthermore, sensor arrays 11A and 11B are attached to patrol robot 1 so that each magnetic sensor Cn of sensor arrays 11A and 11B can detect a magnetic component in a vertical direction. Note that the attachment height of sensor arrays 11A and 11B (magnetic sensors) with reference to floor surface 53S is 50 mm.

Sensor arrays 11A and 11B (FIG. 7) each include detection processing circuit 112 which processes a magnetic measurement values of fifteen magnetic sensors Cn (n is an integer of 1 to 15). Detection processing circuit 112 is a circuit which forms a processing part which processes magnetic measurement values by magnetic sensors Cn to detect magnetic marker 50.

Detection processing circuit 112 calculates, for each magnetic sensor Cn, a temporal difference between magnetic measurement values, and also calculates a positional difference between magnetic measurement values of adjacent magnetic sensors Cn among magnetic sensors Cn arrayed along sensor laying line 11L. The temporal difference between magnetic measurement values for each magnetic sensor Cn is an index indicating a magnetic gradient of each magnetic sensor in the moving direction. The positional difference between magnetic measurement values of adjacent magnetic sensors Cn is an index indicating a magnetic gradient of sensory array 11 in the longitudinal direction. The longitudinal direction of sensor array 11A is the vehicle-width direction of patrol robot 1, and the longitudinal direction of sensor array 11B is the longitudinal direction of patrol robot 1. Note that the longitudinal direction of sensor array 11 is a direction along sensor array line 11L.

Figure 8:
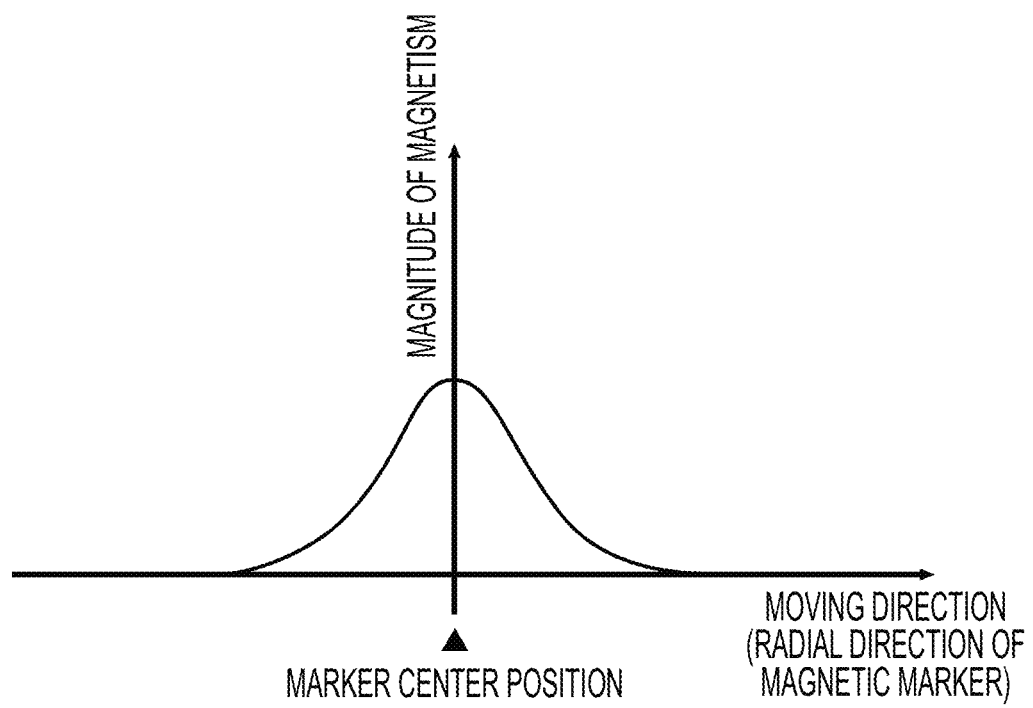
FIG. 8 is a descriptive diagram exemplarily depicting changes of a magnetic measurement value of a magnetic sensor while passing directly above the magnetic marker in the first embodiment.

When any magnetic sensor passes over magnetic marker 50 in accordance with the movement of patrol robot 1, a distribution indicating changes of the magnetic measurement value in the vertical direction by that magnetic sensor becomes like a normal distribution as in FIG. 8, with a peak directly above magnetic marker 50. The moving direction represented by the horizontal axis in the drawing corresponds to the radial direction of magnetic marker 50. The vertical axis in the drawing represents the magnitude of the magnetic component in the vertical direction acting on the magnetic sensor (magnitude of the magnetic measurement value by the magnetic sensor).

Figure 9:
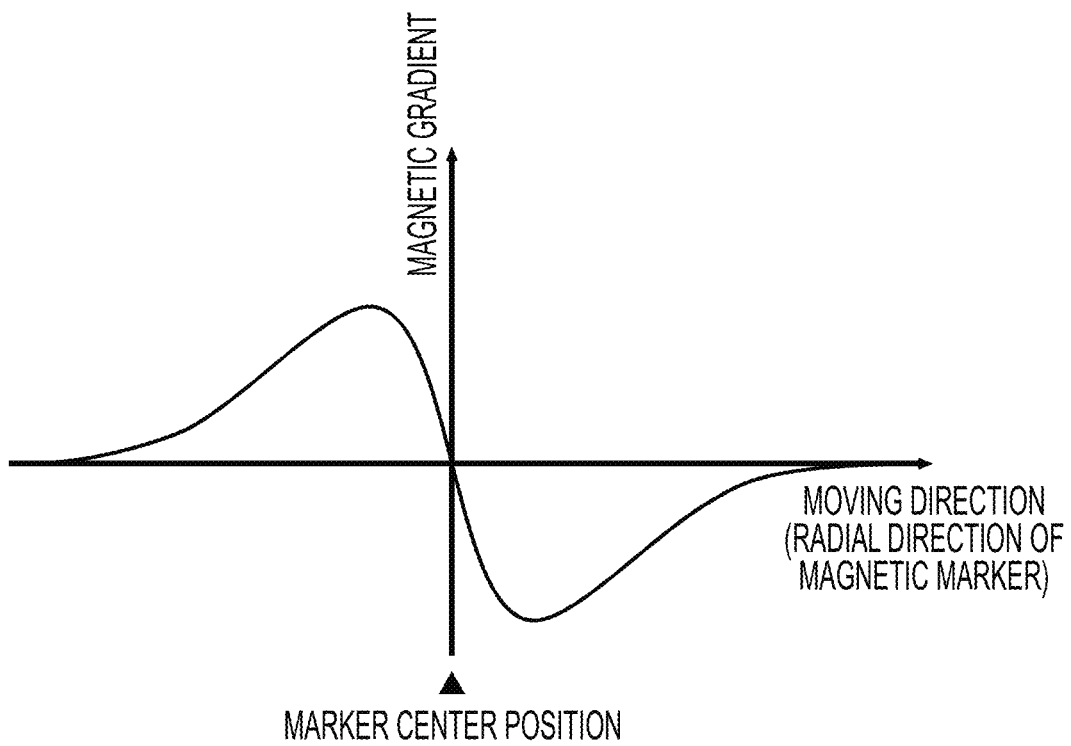
FIG. 9 is a descriptive diagram exemplarily depicting changes of a magnetic gradient in a moving direction while passing directly above the magnetic marker in the first embodiment.

Also, in the distribution exemplarily depicted in FIG. 8, the magnetic gradient in the moving direction, which is a temporal difference between magnetic measurement values of the magnetic sensor, becomes a waveform with the sign reversed, as in FIG. 9. In the waveform of FIG. 9, a reversal of the sign occurs in accordance with whether the magnetic sensor is positioned on a front side of magnetic marker 50 or the magnetic sensor is positioned at a position after passing over magnetic marker 50. The magnetic gradient in the moving direction when the magnetic sensor passes directly above magnetic marker 50 changes so as to cross zero at the position directly above magnetic marker 50.

Detection processing circuit 112 (FIG. 7) detects the reversal of the sign of the magnetic gradient in the moving direction (FIG. 9) to detect magnetic marker 50 (detection process). In the moving direction of the magnetic sensor, this position where the sign of the magnetic gradient in the moving direction is reversed is the position directly above magnetic marker 50.

Figure 10:
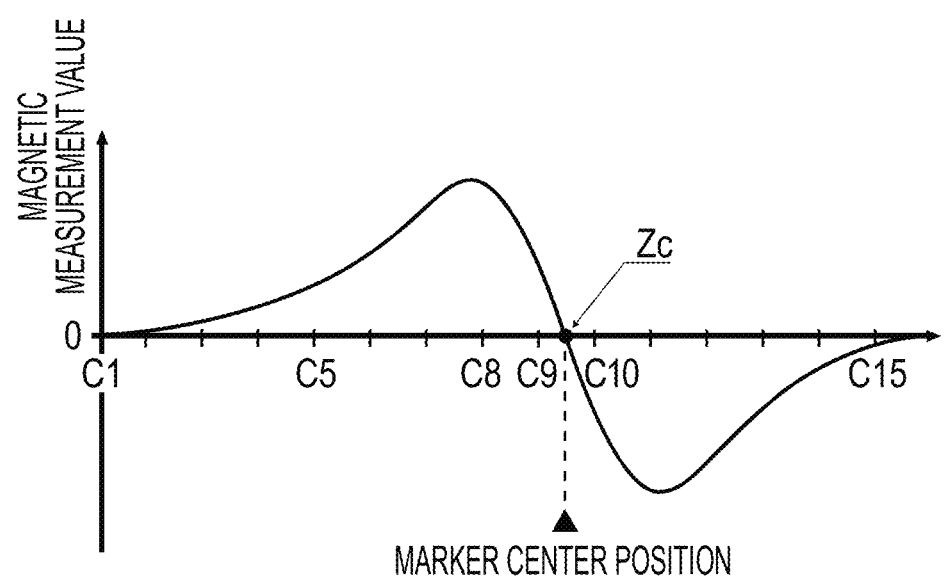
FIG. 10 is a descriptive diagram depicting a distribution curve of magnetic gradients in a longitudinal direction when a sensor array is positioned directly above the magnetic marker in the first embodiment.

When any magnetic sensor is positioned directly above magnetic marker 50, the sign of the magnetic gradient in the longitudinal direction of sensor array 11 to which that magnetic sensor belongs is reversed in accordance with on which side with respect to magnetic marker 50, as in FIG. 10. For example, by detecting zero-cross Zc where the sign of the magnetic gradient in the longitudinal direction of sensor array 11 is reversed, detection processing circuit 112 identifies the position of this magnetic marker 50 in the longitudinal direction. By identifying the position of magnetic marker 50 in the longitudinal direction of sensor array 11, detection processing circuit 112 measures the position of this magnetic marker 50 in the longitudinal direction. Detection processing circuit 112 measures a deviation of the position of magnetic sensor C8, positioned at the center in sensor array 11, with respect to magnetic marker 50 as a shift amount.

Here, the reason why sensor arrays 11A and 11B are disposed so as to form a substantially L shape on the bottom surface of patrol robot 1 (refer to FIG. 5) is described. For example, when patrol robot 1 moves in the longitudinal direction, sensor array 11A in which sensor array line 11L (refer to FIG. 5) is along the vehicle-width direction orthogonal to the moving direction is more suitable for detecting magnetic marker 50. This is because sensor array 11A has a wide detection range orthogonal to the moving direction. Also, the above-described shift amount measured by each magnetic sensor Cn of sensor array 11A is a lateral shift amount (shift amount in a direction orthogonal to the moving direction) of patrol robot 1 with respect to magnetic marker 50. On the other hand, since paths of each magnetic sensor Cn of sensor array 11B in which sensor array line 11L is along the longitudinal direction form one path along the longitudinal direction, this is not suitable for detection of magnetic marker 50.

On the other hand, when patrol robot 1 moves in the vehicle-width direction (in the case of a lateral movement), sensor array 11B in which sensor array line 11L is along the longitudinal direction orthogonal to the moving direction is more suitable for detecting magnetic marker 50. This is because sensor array 11B has a wide detection range orthogonal to the moving direction. Also, the above-described shift amount measured by each magnetic sensor Cn of sensor array 11B is a lateral shift amount of patrol robot 1 with respect to magnetic marker 50.

Next, details of movement control of patrol robot 1 configured as described above are described with reference to a flow diagram of FIG. 11. Here, a flow of movement control is described by focusing on the operation of control circuit 10.

Control circuit 10 first acquires a moving direction of patrol robot 1 calculated by IMU 12 (S101). Note that, as described above, this moving direction is a relative azimuth with reference to the orientation (azimuth of the longitudinal direction toward the front side of patrol robot 1) of patrol robot 1. This moving direction is referred to, as appropriate, as a relative moving direction.

Control circuit 10 selects magnetic sensors (sensor array 11) for use in detection of magnetic marker 50 in accordance with the above-described relative moving direction of patrol robot 1 (S102, selection process). When the relative moving direction of patrol robot 1 substantially matches the longitudinal direction of patrol robot 1, control circuit 10 selects each magnetic sensor configuring sensor array 11A in the vehicle-width direction. On the other hand, in the case of a lateral movement in which the relative moving direction of patrol robot 1 substantially matches the vehicle-width direction, control circuit 10 selects each magnetic sensor configuring sensor array 11B in the longitudinal direction. Also, when the relative moving direction forms an angle equal to or larger than zero degree and equal to or smaller than 45 degrees with respect to the longitudinal direction, control circuit 10 selects each magnetic sensor configuring sensor array 11A. On the other hand, when this angle is larger than 45 degrees and equal to or smaller than 90 degrees, control circuit 10 selects each magnetic sensor configuring sensor array 11B.

When magnetic marker 50 is detected by sensor array 11 (each magnetic sensor) selected at step S102 (S103: YES), control circuit 10 captures the lateral shift amount (shift amount) measured with respect to that magnetic marker 50 from detection processing circuit 112 (S104). Also, control circuit 10 controls tag reader 121 so that is receives tag information from RFID tag 55 affixed to magnetic marker 50, and acquires marker ID included in the tag information (S105).

Control circuit 10 inquires of control-purpose PC 500 about the laying position of magnetic marker 50 corresponding to the marker ID. Control-purpose PC 500 receiving the inquiry refers to the map DB by using the marker ID received from patrol robot 1 to read the laying position of corresponding magnetic marker 50, and replies to patrol robot 1. In this manner, control circuit 10 identifies the laying position of detected magnetic marker 50 (S106).

Control circuit 10 identifies the position of the center (magnetic sensor C8) of sensor array 11 with reference to the laying position of detected magnetic marker 50. Specifically, control circuit 10 identifies, as the position of the center of sensor array 11, a position obtained by shifting along a predetermined direction by the lateral shift amount acquired at step S104 described above with reference to the laying position of magnetic marker 50. The direction of shifting the position is the longitudinal direction (direction of sensor array line 11L) of sensor array 11 selected at step S102 described above. Control circuit 10 identifies a current position, which is the position of patrol robot 1, based on the position of the center of sensor array 11 identified as described above (S107). Then, control circuit 10 controls front and rear drive motors 16 so that the deviation of the current position with respect to the set route is suppressed (S108).

Note that to identify the current position of patrol robot 1 at step S107, it is preferable to use a positional deviation between magnetic sensor C8 of sensor array 11 used for detection of magnetic marker 50 and the center position of patrol robot 1. Based on the position of magnetic sensor C8, a position acquired by shifting by this deviation is preferably taken as the current position of patrol robot 1.

On the other hand, if no magnetic marker 50 has been detected (S103: NO), control circuit 10 acquires a two-dimensional displacement amount estimated by IMU 12 (S114). This two-dimensional displacement amount is a displacement amount after movement after passage over the most recent position of patrol robot 1 identified in response to detection of magnetic marker 50. With reference to this most recent position of patrol robot 1, control circuit 10 identifies, as a new current position, a position acquired by shifting by the two-dimensional displacement amount acquired at step S114 (S115). Then, as with the case in which magnetic marker 50 has been detected, control circuit 10 controls front and rear drive motors 16 so that the deviation of the current position with respect to the set route is suppressed (S108).

Patrol robot 1 configured as described above of the present embodiment can make diverse movements such as a lateral movement and rotations in place, by control of front and rear driving wheels 16. In accordance with the relative moving direction with reference to the longitudinal direction, this patrol robot 1 selects sensor arrays 11 and switches to selected sensor array 11 to be applied to detection of magnetic marker 50. Specifically, patrol robot 1 selects sensor array 11 (each magnetic sensor) which is wide in a direction orthogonal to the moving direction, for use in detection of magnetic marker 50. By selecting sensor array 11 in accordance with the mode of movement of patrol robot 1 in this manner, magnetic marker 50 can be detected with high reliability, irrespective of the mode in which patrol robot 1 moves.

Figure 12:
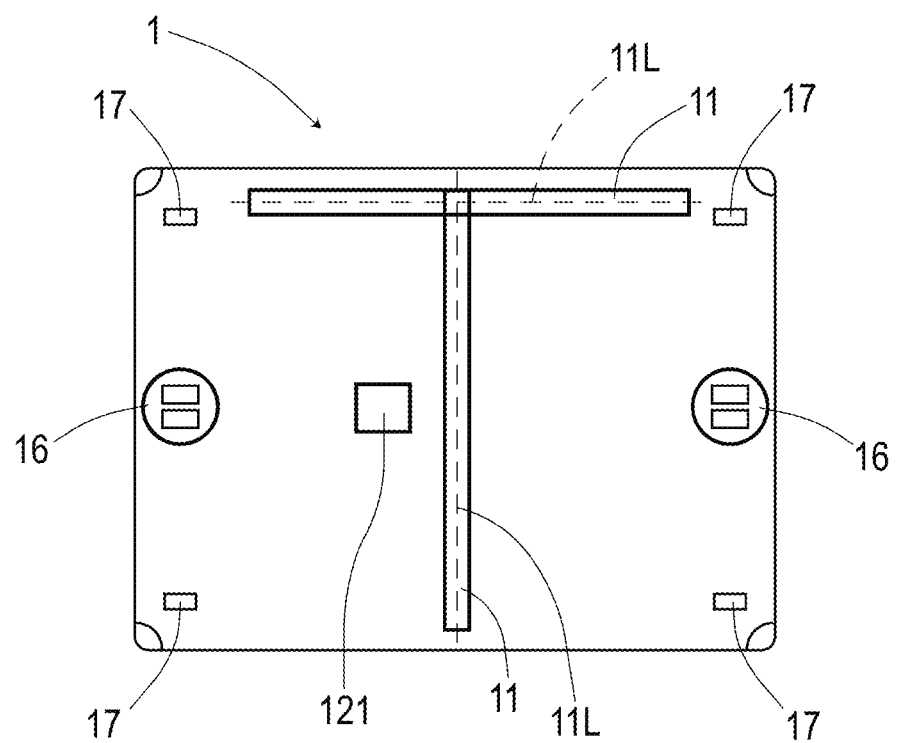
FIG. 12 is a bottom view of a first another patrol robot in the first embodiment.
Figure 13:
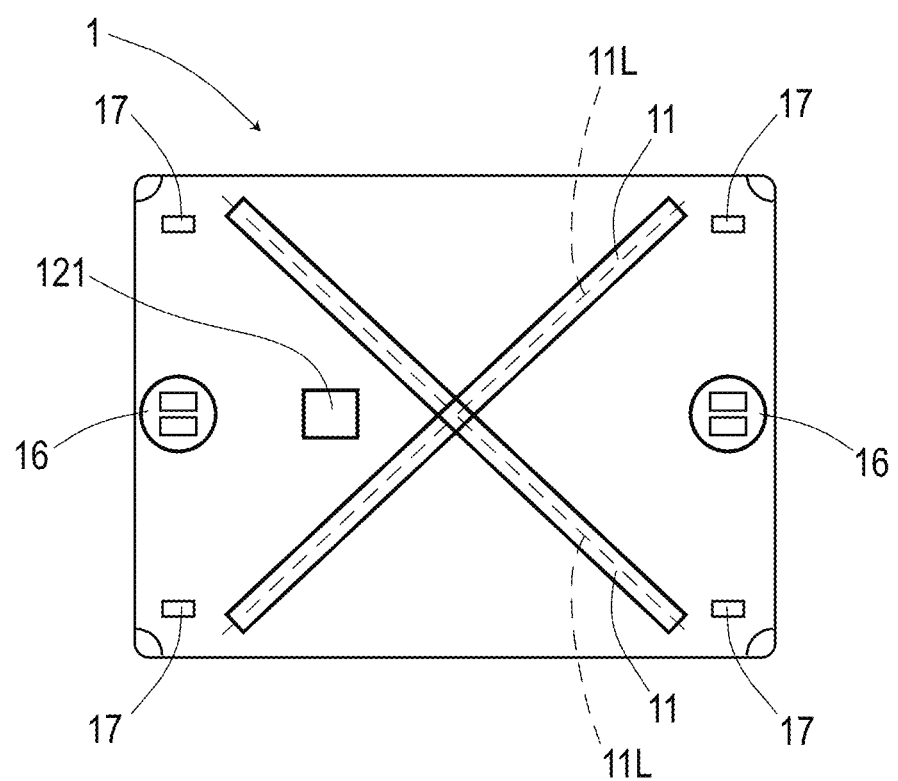
FIG. 13 is a bottom view of a second another patrol robot in the first embodiment.
Figure 14:
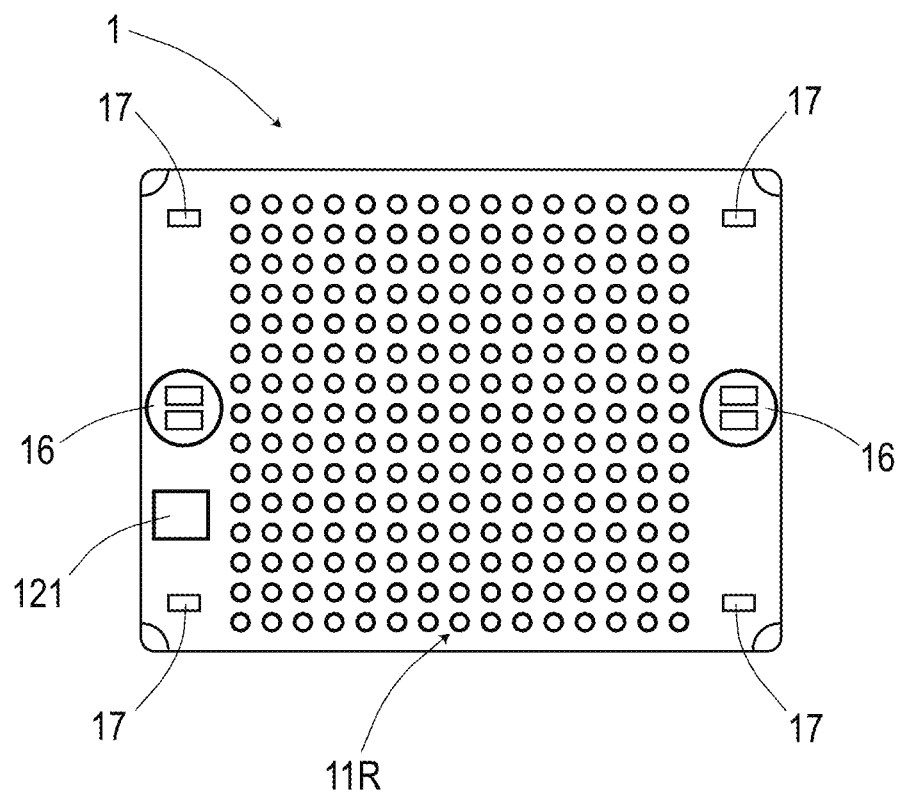
FIG. 14 is a bottom view of a third another patrol robot in the first embodiment.

Note that, in place of the configuration of the present embodiment, for example, as exemplarily depicted in FIG. 12, two sensor arrays 11 may be disposed so as to form a substantially T shape. Alternatively, as exemplarily depicted in FIG. 13, two sensor arrays 11 may be disposed so as to cross in a substantially X shape. Furthermore, as in FIG. 14, magnetic sensors (circular marks in the drawings) may be arrayed so as to form 15×15 two-dimensional array 11R. In this case, among the magnetic sensors arrayed in a two-dimensional array, magnetic sensors arrayed in a direction orthogonal to the moving direction of patrol robot 1 (direction of the sensor array line) are selected, and can be used for detection of magnetic marker 50. Also, four sensor array lines may be provided so as to form each side of a quadrangle. In this case, the magnetic sensors are arrayed so as to form a rectangular annular shape.

Note in the configuration of the present embodiment that patrol robot 1 includes all configurational functions of the system such as the anomaly detecting part which detects an anomaly, the selecting part which selects a magnetic sensor for use in detection of magnetic marker 50, and the movement control part which causes patrol robot 1 to move. The system may be such that these functions are included in control-purpose PC 500 and patrol robot 1 uploads information required to achieve this function to control-purpose PC 500.

Note that while patrol robot 1 keeping watch over the inside of the facility is described as one example of a vehicle in the present embodiment, the vehicle may be an unattended carrier vehicle for use in a factory or the like, an autonomous traveling vehicle such as a bus circulating inside a facility, or a general vehicle.

Second Embodiment

The present embodiment is an example in which, based on the patrol robot of the first embodiment, rotatable sensor array 11 is adopted. Details of this are described with reference to FIG. 15 and FIG. 16.

Figure 15:
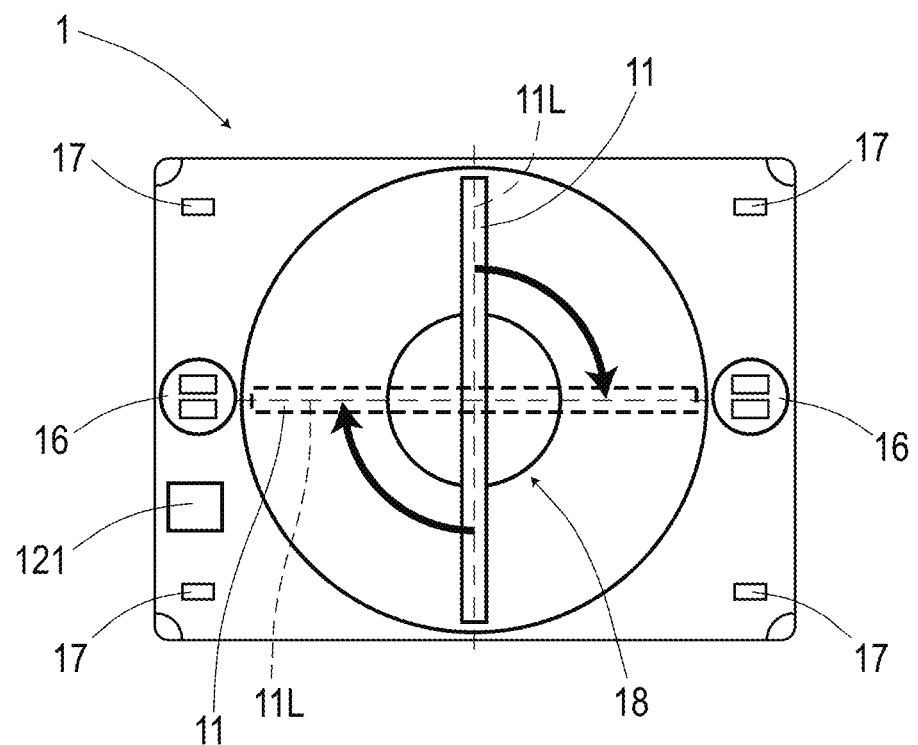
FIG. 15 is a bottom view of a patrol robot in a second embodiment.

FIG. 15 depicts the bottom surface of patrol robot 1 of the present embodiment. At the center of the bottom surface of patrol robot 1 of the present embodiment, sensor rotating unit 18 which rotatably supports sensor array 11 is attached. In a state of being supported by sensor rotating unit 18, sensor array 11 can rotate in a range of 90 degrees from an angle along the vehicle-width direction to an angle along the longitudinal direction.

Figure 16:
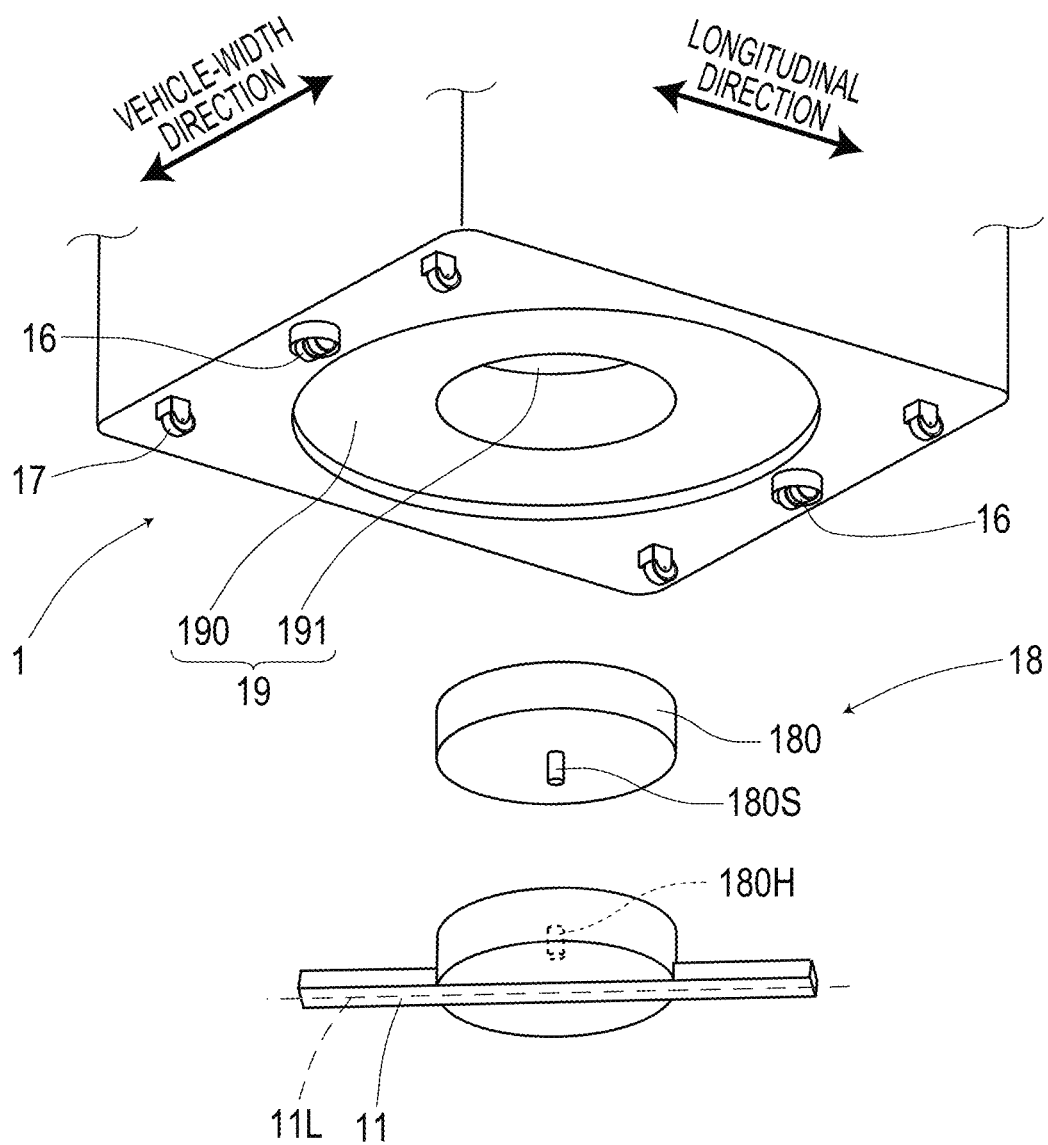
FIG. 16 is a descriptive diagram depicting a assembling structure of a sensor rotating unit to the patrol robot.

Sensor rotating unit 18 is configured to include, as in FIG. 16, disk-shaped base 180 fixed to a patrol robot 1 side and a rotary holder 181 which retains sensor array 11 in a radial direction. Sensor array 11 forms one example of a retaining part which retains a plurality of magnetic sensors arrayed along sensor array line 11L. Sensor rotating unit 18 forms one example of a driving part which rotates sensor array 11 forming one example of the retaining part.

In base 180, a rotating motor not depicted is accommodated so that rotating axis 180S matches the center axis. Rotary holder 181 forms a disk shape with a diameter slightly smaller than that of base 180, and has shaft hole 180H provided to be bored along the center axis for rotating shaft 181S to be inserted therein. Rotary holder 181 is rotatably supported by base 180 via rotating shaft 181S inserted in shaft hole 180H. Note that, as with the first embodiment, sensor array 11 is a rod-shaped unit having fifteen magnetic sensors arrayed with 3 cm pitches along laying line 11L extending linearly.

In the bottom surface of patrol robot 1, as in FIG. 16, accommodation hole 19 for accommodating sensor rotating unit 18 is provided to be bored. This accommodation hole 19 is a hole having a circular section and a two-step diameter with a combination of small-diameter part 190 on a depth side and large-diameter part 191 on a front side. Small-diameter part 190 is a hole for accommodating base 180 and rotary holder 181 of sensor rotating unit 18. Large-diameter part 191 is a hole accommodating sensor array 11. Sensor array 11 accommodated in large-diameter part 191 is rotatable in a state of being flush with or slightly retired with respect to the bottom surface of patrol robot 1. Sensor rotating unit 18 is attached as being hung on a patrol robot 1 side, in a state in which base 180 is fixed to small-diameter part 190.

Figure 11:
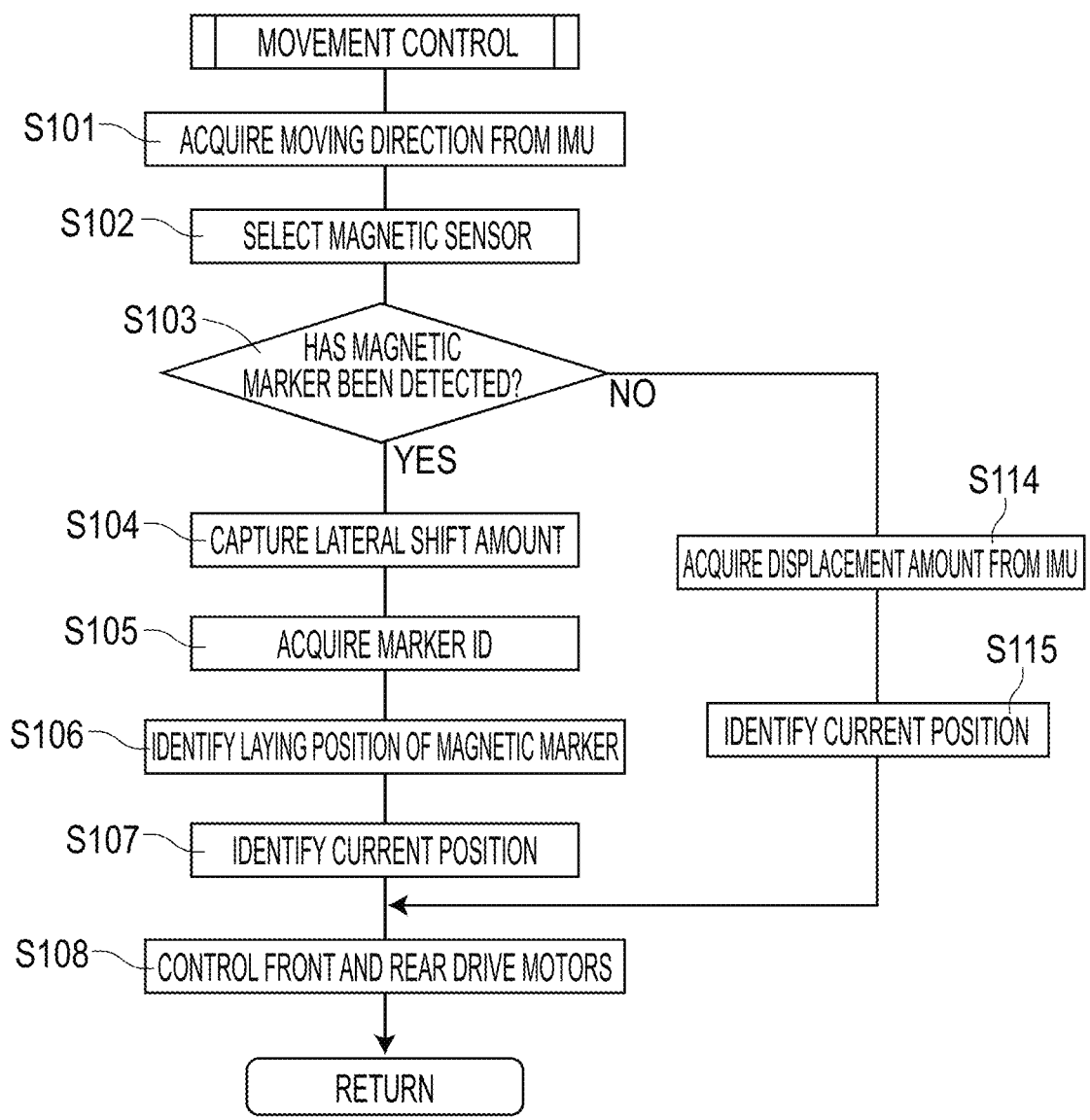
FIG. 11 is a flow diagram depicting a flow of movement control of the patrol robot in the first embodiment.

In movement control by patrol robot 1 of the present embodiment, in place of step S102 in FIG. 11, which is referred to in the first embodiment, a process of rotating sensor array 11 is performed. In this process, sensor array 11 is rotated so that sensor array line 11L is orthogonal to the relative moving direction (moving direction with respect to the longitudinal direction) of patrol robot 1.

Note that the rotation range of sensor array 11 may be a range of 180 degrees. In this case, the orientation of sensor array 1 can be reversed between a time when patrol robot 1 advances and a time when it advances in reverse. When sensor array 11 is reversed, for example, magnetic sensor C1 is positioned on a left side and magnetic sensor C15 is positioned on a right side when oriented to the moving direction. Therefore, in this case, for example, when a shift amount with respect to the magnetic marker is calculated, it is not required to consider left-right switching between the time of advance and the time of retreat of patrol robot 1, and the arithmetic process can be simplified. Note that it may be configured that a shaft is provided at an end portion of sensor array 11 to cause turn about the shaft, like a wiper of a vehicle. It may also be configured that a shaft is provided between the center and the end portion to cause sensor array 11 to rotate or turn about the shaft.

Note that the other configurations and the operation and effects are similar to those in the first embodiment.

In the foregoing, while specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 patrol robot (vehicle, system)
10 control circuit (selecting part)
11, 11A, 11B sensor array (retaining part)
Cn magnetic sensor
11L sensor array line
112 detection processing circuit (processing part)
12 IMU
121 tag reader
131 depth camera
133 ultrasonic sensor
16 driving wheel
16U driving wheel unit
18 sensor rotating unit (driving part)
5 facility
5S patrol system
50 magnetic marker
500 control-purpose PC
53S floor surface
55 RFID tag (wireless tag)

The invention claimed is:

1. A vehicle comprising:
A plurality of magnetic sensors to detect a magnetic marker laid in or on a traveling road, the plurality of magnetic sensors including at least two or more magnetic sensors arranged on a sensor array line linearly extending along any direction;
a retained which retains the at least two or more magnetic sensors arrayed along the sensor array line;
a rotating driver which rotates the retained, the rotating driver including a base member fixed to the vehicle and a rotating member that is rotatably supported by the base member via a rotating shaft and supports the retained so that the sensor array line is aligned in a radial direction;
processing circuitry configured to control the vehicle based on detection by the plurality of magnetic sensors,
wherein, in the vehicle, at least one sensor array line is formed, and the at least one sensor array line crosses with respect to a relative moving direction of the magnetic marker with a movement of the vehicle,
wherein the processing circuitry is configured to control the rotating driver to rotate the retainer so that the at least one sensor array line crosses with respect to the relative moving direction of the magnetic marker with a motion of the vehicle, and
wherein the processing circuitry is configured to control the motion of the vehicle in a vehicle-width direction, without changing front-end orientation of the vehicle.

2. The vehicle according to claim 1,
wherein the processing circuitry is configured to control the motion of the vehicle so that the at least one sensor array line crosses with respect to the relative moving direction of the magnetic marker at an angle equal to or larger than 45 degrees.

3. The vehicle according to claim 2,
wherein, as the at least one sensor array line, two sensor array lines crossing each other are formed.

4. The vehicle according to claim 2,
wherein the plurality of magnetic sensors are two-dimensionally arrayed, and sensor array lines crossing each other are formed of the plurality of two-dimensionally-arrayed magnetic sensors.

5. The vehicle according to claim 2,
wherein the processing circuitry is further configured to select at least any two or more magnetic sensors among the plurality of magnetic sensors; and
detect the magnetic marker by processing magnetic measurement values by the selected at least any two or more magnetic sensors, wherein
the processing circuitry is configured to select the at least any two or more magnetic sensors arranged on the at least one sensor array line crossing with respect to the relative moving direction of the magnetic marker with a motion of the vehicle.

6. The vehicle according to claim 1,
wherein, as the at least one sensor array line, two sensor array lines crossing each other are formed.

7. The vehicle according to claim 1,
wherein the plurality of magnetic sensors are two-dimensionally arrayed, and sensor array lines crossing each other are formed of the plurality of two-dimensionally-arrayed magnetic sensors.

8. The vehicle according to claim 1,
wherein the processing circuitry is further configured to
select at least any two or more magnetic sensors among the plurality of magnetic sensors; and
detect the magnetic marker by processing magnetic measurement values by the selected at least any two or more magnetic sensors, wherein
the processing circuitry is configured to select the at least any two or more magnetic sensors arranged on the at least one sensor array line crossing with respect to the relative moving direction of the magnetic marker with a motion of the vehicle.

9. The vehicle according to claim 1, further comprising:
front and rear driving wheels which are rotatably supported by a wheel driver provided on a bottom surface of the vehicle system, each of the front and the rear driving wheels being individually controlled in 360 degrees around a rotation axis perpendicular to the bottom surface by the wheel driver,
wherein the processing circuitry is configured to control the wheel driver to perform the motion of the vehicle in a vehicle-width direction by the front and the rear driving wheels.

10. A vehicle comprising:
A plurality of magnetic sensors to detect a magnetic marker laid in or on a traveling road, the plurality of magnetic sensors including at least two or more magnetic sensors arranged on at least one sensor array line;
a rotating driver which rotates the retainer, the rotating driver including a base member fixed to the vehicle and a rotating member that is rotatably supported by the base member via a rotating shaft and supports the retainer so that the at least one sensor array line is aligned in a radial direction;
processing circuitry configured to control the vehicle based on detection by the plurality of magnetic sensors,
wherein, in the vehicle, at least two sensor array lines which cross each other are formed,
wherein the processing circuitry is configured to acquire a relative moving direction of the vehicle based on a front-rear direction of the vehicle, select a target sensor array line, from the at least two sensor array lines, that is wide in a direction orthogonal to the relative moving direction of the vehicle, and detect the magnetic marker based on the target array line; and
wherein the processing circuitry is configured to control the rotating driver to rotate the retainer so that the target sensor array line is set to be wide in the direction orthogonal to the relative moving direction of the vehicle.

11. The vehicle according to claim 10,
wherein the plurality of magnetic sensors are two-dimensionally arrayed, and the at least two sensor array lines crossing each other are formed of the plurality of two-dimensionally-arrayed magnetic sensors.

12. The vehicle according to claim 10,
wherein the processing circuitry is configured to control a motion of the vehicle in a vehicle-width direction, without changing front-end orientation of the vehicle.

13. The vehicle according to claim 12, further comprising:
front and rear driving wheels which are rotatably supported by a wheel driver provided on a bottom surface of the vehicle system, each of the front and the rear driving wheels being individually controlled in 360 degrees around a rotation axis perpendicular to the bottom surface by the wheel driver,
wherein the processing circuitry is configured to control the wheel driver to perform the motion of the vehicle in a vehicle-width direction by the front and the rear driving wheels.

14. The vehicle according to claim 10,
wherein the at least two sensor array lines include a first sensor array line and a second sensor array line,
wherein the first sensor array line is arranged on a bottom surface of the vehicle along a vehicle-width direction of the vehicle, and
wherein the second sensor array line is arranged on the bottom surface of the vehicle along the front-rear direction of the vehicle.

15. The vehicle according to claim 10,
wherein the at least two sensor array lines are disposed so as to form at least one of substantially L shape, T shape or X shape.

* * * * *